Figure 1:
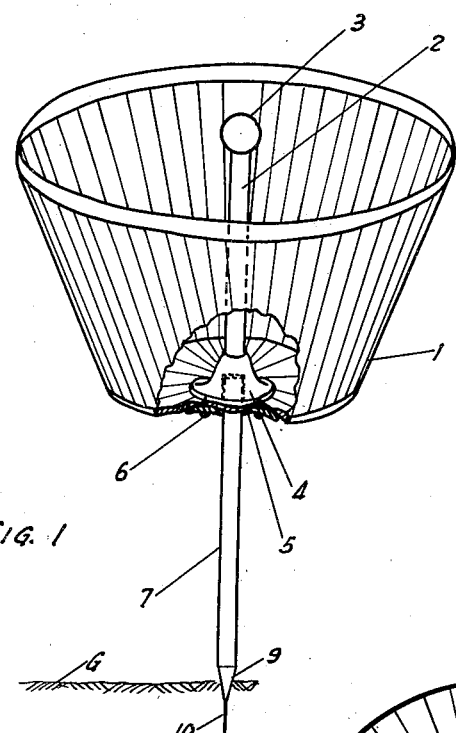

March 20, 1945. A. F. FLOURNOY 2,372,073
HARVESTING BASKET
Filed Aug. 6, 1943 2 Sheets-Sheet 1

Inventor
Algernon F. Flournoy

March 20, 1945.    A. F. FLOURNOY    2,372,073
HARVESTING BASKET
Filed Aug. 6, 1943    2 Sheets-Sheet 2

Inventor
Algernon F. Flournoy

Patented Mar. 20, 1945

2,372,073

UNITED STATES PATENT OFFICE 2,372,073

HARVESTING BASKET

Algernon F. Flournoy, Shreveport, La.

Application August 6, 1943, Serial No. 497,705

3 Claims. (Cl. 220—18)

My invention relates to baskets and more especially to harvesting baskets.

An object of my invention is to provide a harvesting basket with a lifting handle to enable the operator to hold the basket with one hand leaving his other hand free for the work of harvesting.

Another object of my invention is to provide a harvesting basket with a support to hold the basket in an elevated position for the convenience of harvesting.

Other objects and advantages of my invention will become apparent from reading my detailed description of harvesting baskets illustrated by my accompanying drawings forming a part of my disclosure in which is illustrated a preferred form of my invention and two modifications of my invention.

Figure 2:
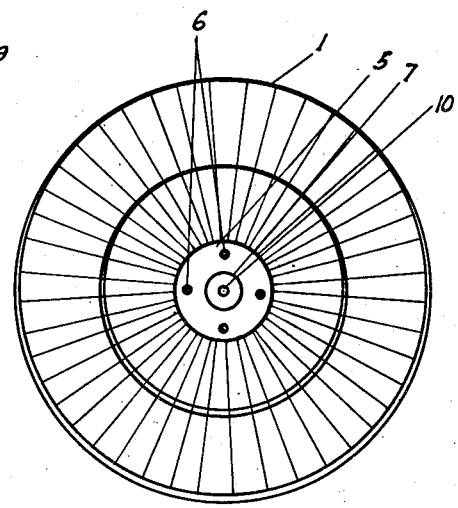
Figure 3:
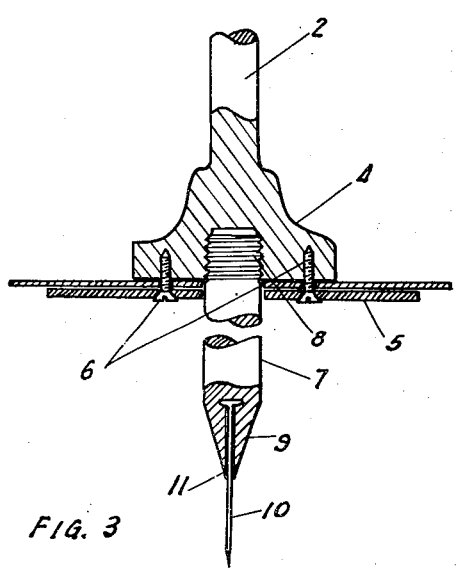
Figures 4, 5:
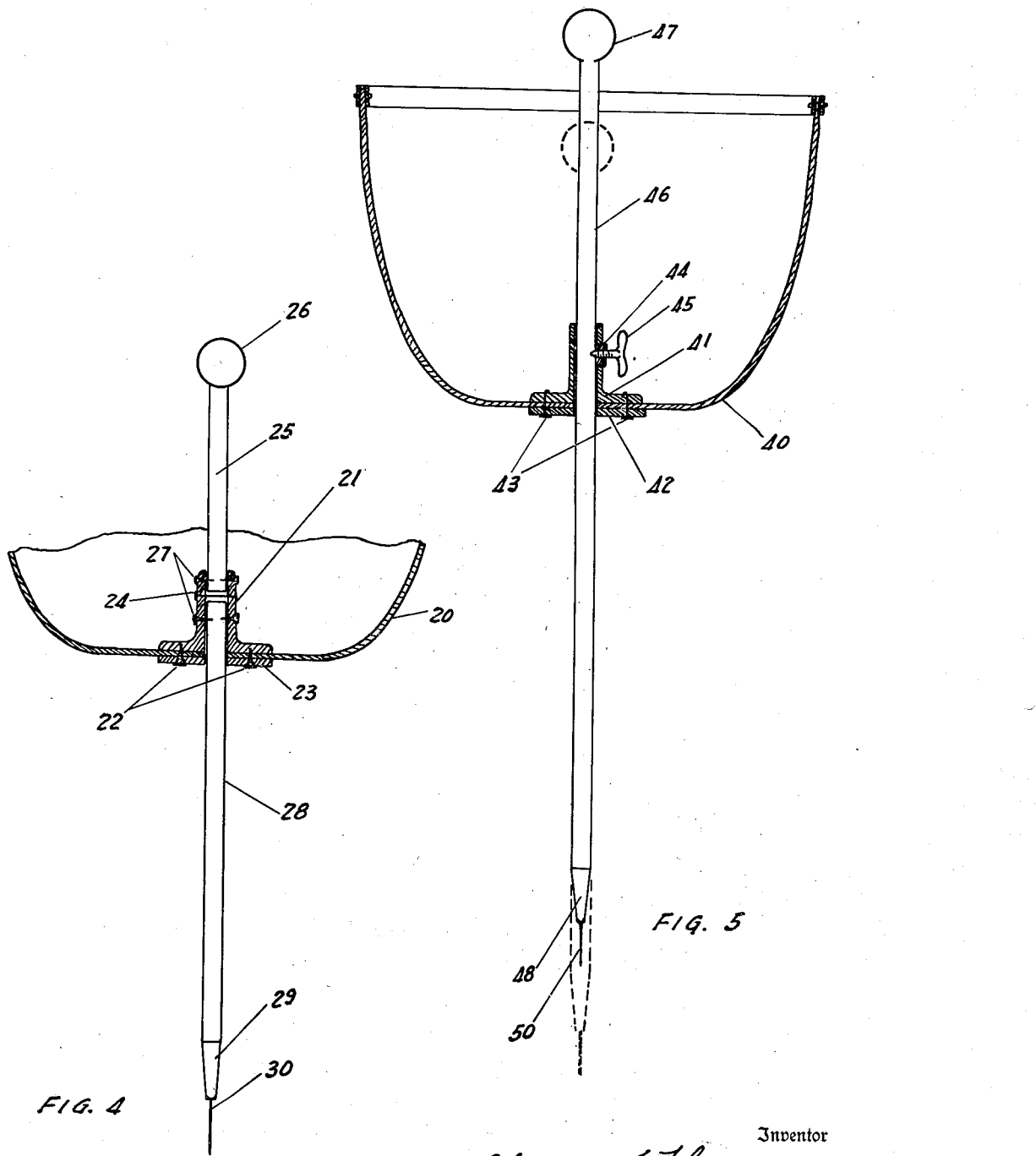

In the drawings:

Figure 1 is a perspective view partly broken away of the preferred form of harvesting basket embodying my invention, Figure 2 is a bottom plan view of the basket illustrated by Figure 1, Figure 3 is an enlarged view in part cross section of a portion of the basket illustrated by Figures 1 and 2, Figure 4 is an elevation view in part cross section of a modified form of harvesting basket embodying my invention, and Figure 5 is an elevation view in part cross section of another modified form of harvesting basket embodying my invention.

The use of baskets for harvesting low growing produce and produce such as fruits growing on trees and vines is, of course, a well known practice, but with my invention in harvesting baskets I introduce a feature of convenience heretofore not found in the harvesting basket art as far as I know. This feature of improvement resides in the use of a vertical support for holding the harvesting basket at a convenient height to the harvester to permit both of his hands to be used in the harvesting operation. This feature also eliminates the labor of stooping over to deposit the harvest in the harvesting basket. I shall now explain more in detail this feature and other features of novelty of my invention by my detailed description of baskets illustrated in my drawings.

Referring to Figures 1 to 3 of the drawings: Numeral 1 designates a basket member to which a handle 2 provided with a lifting knob 3 is attached by means of a ferrule 4 having a centrally located upwardly extending threaded hole. For the purpose of reinforcing the bottom of the basket member 1 I employ a centrally perforated circular shaped reinforcing plate 5. The bottom of the basket member 1 is sandwiched in between the ferrule 4 and the reinforcing plate 5. I fasten the reinforcing plate 5 to the ferrule 4 by means of screws 6 that are extended through the reinforcing plate 5, the bottom of the basket member 1, and then into the ferrule 4. It is to be understood, of course, that other fastening means such as nails, bolts, or glue might be used if desired.

The basket thus far described constitutes a useful harvesting basket with a novel handle extending upwardly from the center of the basket member and is a construction that falls within the first object of my invention.

Through the perforated reinforcing plate 5 the threaded end 8 of the supporting rod 7 is screwed into the ferrule 4 to support the basket member 1 in an elevated position as shown in Figure 3. The lower end of the supporting rod 7 is formed into a tapered end 9 and out of which a spike 10 is extended. The spike 10 in this preferred form of my invention is mounted in a hole bored into the tapered end 9. The spike 10 is secured in the hole in the tapered end 9 by means of plastic wood, a water resisting glue, or other similar substance. I prefer to use plastic wood to cement the spike 10, which may be an iron building spike, in the tapered end 9 to utilize the plastic wood as a protective coating over the lowermost tip of the tapered end 9 to protect it from erosion incident to the use of my harvesting basket wherein both the spike and the tapered end 9 may be forced into the ground G.

The supporting rod 7 and the other members of my harvesting basket are preferably made out of light wood, except, of course, the screws 6 that are made of brass.

In Figure 1 both the spike 10 and a part of the tapered end 9 are shown embedded in the ground G. In a case where the ground G is hard such as a lawn surface, only the spike 10 need be forced into it to support the harvesting basket. In this preferred form of my invention the supporting rod 7 of different lengths are intended to be used according to the particular job of gathering to be done. In using the harvesting basket in weeding a garden which necessitates either a squatting or a bending over position, I have found that a supporting rod 7 about two feet in height was very convenient. The supporting rod 7 should be made out of round stock about one inch in diameter.

Before proceeding with the detailed description of the other modifications of my invention, I want to point out to the reader other advantages of my invention in addition to the convenience of proper elevation. In using the single point support, the spike 18 or the spike 18 plus the tapered end 9 can be repeatedly thrust into the midst of growing foliage without injuring it while the basket is moved from place to place during its use. The spike 18 may be used as a means for collecting scraps of paper, fruit peelings and the like if desired.

The harvesting basket illustrated by Figure 4 is very similar to the above described preferred type of harvesting basket. On the upper side of the bottom of the basket member 20 a centrally bored elongated ferrule 21 is mounted by means of screws 22 extended through a centrally perforated reinforcing plate 23 placed underneath it. The bore of the elongated ferrule 21 is divided into an upper and lower recess by means of a dividing nail 24. The handle 25 having a handle knob 26 is fitted into the upper recess of the elongated ferrule 21 and fastened into it by means of one or more wood screws 27.

The supporting rod 28 which is fastened in the lower recess of the elongated ferrule 21 by screws 27 terminates in a tapered end 29. The spike 30 in this form of my invention may be driven into the tapered end 29 or fastened in any other conventional manner, or fastened as heretofore described in connection with the spike 18 of my preferred form of harvesting basket.

In this modification of my invention the reader will readily see that not only supporting rods 28 of varying lengths but also handles 25 of varying lengths may be used.

In the last illustrated modification of my invention shown in Figure 5, numeral 40 designates the basket member, 41 the bored ferrule member, and 42 a centrally perforated reinforcing plate. In this modification of my invention, I use nails 43 as fastening means for fastening the ferrule 41 to the bottom of the basket member 40. An internally and externally threaded metal collar 44 is embedded in the bored ferrule 41 when it is made out of wood to carry the clamping screw 45 threadedly engaged with the metal collar 44.

By means of the clamping screw 45 the combined supporting rod and handle 46 extended through the bored ferrule 41, the bottom of the basket member 40 and the reinforcing plate 42 may be adjusted as shown by the dotted lines of Figure 5 for any desired supporting height. The upper end of the combined supporting rod and handle 46 terminates in a lifting knob 47 while at the bottom it terminates in a tapered end 49 and out of which extends the spike 50. The spike 50 is driven into the tapered end 49 or fastened in other manners above discussed in connection with the spike 18 and the spike 28. This modification of my invention wherein a combined supporting rod and handle 46 of about 4 or 5 feet in height was used has been found most useful for holding clothes while they are being hung on a line to dry.

Having thus described my invention, I claim:

1. A harvesting basket comprising a basket member, a handle member for lifting said basket member, a supporting rod extending downwardly from the bottom of said basket member adapted to support said basket member in an elevated position above the surface of the ground, said supporting rod terminating in a cone shaped point at its lower end and provided with a spike extending out of said cone shaped point, said cone shaped point being adapted to serve as a stop to limit the penetration of said spike in the ground and as a means to prevent a tilting movement of said spike in the ground.

2. A harvesting basket comprising a basket member, a tubular shaped ferrule extending perpendicularly from the bottom of said basket member, said ferrule having a straight bore extending entirely through it, a handle member adapted to slidably fit in said bore of said ferrule and extend upwardly from said ferrule, a means for clamping said handle member in said ferrule in adjusted positions in said ferrule, a supporting rod adapted to slidably fit in said bore of said ferrule, a means for clamping said supporting rod in said ferrule in varying chosen adjusted positions in said ferrule, said supporting rod being provided with a spike extending out of its lower end, whereby said basket member may be supported in verying chosen vertically elevated positions above the ground.

3. A harvesting basket comprising a basket member with a hole through its bottom, a tubular shaped ferrule extending perpendicularly from said bottom of said basket member, said ferrule having a straight bore of a diameter equal to or greater than said hole, said bore being extended throughout the length of said ferrule and aligned with said hole, a basket supporting rod extended through said bore and said hole and a means for clamping said supporting rod in longitudinally adjusted positions in said ferrule, the lower end of said supporting rod terminating in a cone shaped point, said supporting rod being provided with a spike extending out of said cone shaped point adapted to pierce the ground, the upper end of said supporting rod constituting a handle for lifting said harvesting basket and for shoving said spike and said cone shaped point into the ground.

ALGERNON F. FLOURNOY.